(12) United States Patent
Kang et al.

(10) Patent No.: US 11,360,786 B2
(45) Date of Patent: Jun. 14, 2022

(54) DEVICE AND METHOD FOR GENERATING GUI FOR CONTROLLING EXTERNAL DEVICE

(71) Applicant: Samsung Electronics Co., Ltd., Suwon-si (KR)

(72) Inventors: Seung-soo Kang, Seoul (KR); Jung-han Kim, Hwaseong-si (KR); Byeong-cheol Yoon, Suwon-si (KR); Kwang-soo Jung, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 16/321,257

(22) PCT Filed: Jul. 25, 2017

(86) PCT No.: PCT/KR2017/008000
§ 371 (c)(1),
(2) Date: Jan. 28, 2019

(87) PCT Pub. No.: WO2018/021798
PCT Pub. Date: Feb. 1, 2018

(65) Prior Publication Data
US 2019/0163503 A1    May 30, 2019

(30) Foreign Application Priority Data
Jul. 28, 2016    (KR) .................. 10-2016-0096129

(51) Int. Cl.
*G06F 9/445*    (2018.01)
*G06F 9/4401*   (2018.01)
(Continued)

(52) U.S. Cl.
CPC ........ *G06F 9/44505* (2013.01); *G06F 3/0484* (2013.01); *G06F 8/38* (2013.01);
(Continued)

(58) Field of Classification Search
CPC .... G06F 9/44505; G06F 9/451; G06F 3/0484; G06F 8/38; G06F 9/4411; G06F 9/445; G06F 9/44578; G06F 9/54
(Continued)

(56) References Cited

U.S. PATENT DOCUMENTS 7,293,236 B2   11/2007   Choi et al.
7,356,824 B2   4/2008    Stickler et al.
(Continued)

FOREIGN PATENT DOCUMENTS

KR    10-0438696 B1        7/2004
KR    10-2012-0079208  *   7/2012   .............. H04Q 9/04
(Continued)

OTHER PUBLICATIONS

Nichols et al., "Huddle: Automatically Generating Interfaces for Systems of Multiple Connected Appliances", 2006, [Online], pp. 279-288, [Retrieved from internet on Feb. 18, 2022], <https://dl.acm.org/doi/pdf/10.1145/1166253.1166298> (Year: 2006).*
(Continued)

*Primary Examiner* — S. Sough
*Assistant Examiner* — Zengpu Wei
(74) *Attorney, Agent, or Firm* — Jefferson IP Law, LLP

(57)    ABSTRACT

Provided is a device and method for generating a graphic user interface (GUI) for controlling a plurality of external devices. The device includes a communication interface configured to communicate with the plurality of external devices and download a plurality of control applications to control the plurality of external devices, a processor configured to collect, from the plurality of downloaded control applications, function information to control the plurality of external devices, and configured to provide an integrated application to control the plurality of external devices by using the collected function information, and a display
(Continued)

displaying the GUI for controlling the plurality of external devices when the integrated application is executed.

15 Claims, 15 Drawing Sheets

(51) Int. Cl.

| | | |
|---|---|---|
| *G06F 8/38* | (2018.01) | |
| *G06F 3/0484* | (2022.01) | |
| *G06F 9/451* | (2018.01) | |
| *G06F 9/54* | (2006.01) | |

(52) U.S. Cl.
CPC ............ *G06F 9/445* (2013.01); *G06F 9/4411* (2013.01); *G06F 9/44578* (2013.01); *G06F 9/451* (2018.02); *G06F 9/54* (2013.01)

(58) Field of Classification Search
USPC .......................................... 717/174
See application file for complete search history.

(56) References Cited

U.S. PATENT DOCUMENTS

| | | | |
|---|---|---|---|
| 10,116,505 B2 | 10/2018 | Kim et al. | |
| 2006/0161865 A1* | 7/2006 | Scott ...................... | G08C 17/00 |
| | | | 715/810 |
| 2011/0041078 A1* | 2/2011 | Park ...................... | G06F 3/0481 |
| | | | 715/746 |
| 2011/0154228 A1 | 6/2011 | Kinoshita | |
| 2014/0075383 A1 | 3/2014 | Zheng | |
| 2014/0359006 A1* | 12/2014 | Jung ....................... | H04L 67/42 |
| | | | 709/203 |
| 2015/0009020 A1* | 1/2015 | Shekhar ................. | G08C 17/02 |
| | | | 340/12.5 |
| 2015/0180951 A1* | 6/2015 | Barnreuther .......... | G06F 9/4451 |
| | | | 709/201 |
| 2016/0139752 A1 | 5/2016 | Shim et al. | |
| 2017/0255362 A1 | 9/2017 | Kim et al. | |

FOREIGN PATENT DOCUMENTS

| | | | | |
|---|---|---|---|---|
| KR | 10-2012-0079208 A | 7/2012 | | |
| KR | 10-2014-0077093 A | 6/2014 | | |
| KR | 10-2014-0147059 A | 12/2014 | | |
| KR | 10-2015-0024938 A | 3/2015 | | |
| KR | 10-2015-0051865 | * 5/2015 | ............... | H04Q 9/00 |
| KR | 10-2015-0051865 A | 5/2015 | | |

OTHER PUBLICATIONS

Daniel Thommes et al., "RemoteUI: A high-performance remote user interface system for mobile consumer electronic devices", IEEE Transactions on Consumer Electronics, IEEE Service Center, New York, US, vol. 58, No. 3, Aug. 1, 2012, pp. 1094-1102, XP011465134.

Extended European Search Report dated Jul. 17, 2019, issued in European Patent Application No. 17834740.7-1224.

International Search Report and Written Opinion dated Oct. 26, 2017, issued in International Application No. PCT/KR2017/008000.

Ndian Office Action dated Feb. 9, 2021, issued in Indian Application No. 201927006498.

* cited by examiner

FIG. 6

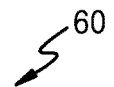

| LEVEL OF FUNCTION | LEVEL 1 | LEVEL 2 | LEVEL 3 |
|---|---|---|---|
| EXTRACTED INFORMATION | LIST OF FUNCTIONS ALLOWED TO INTEGRATED APPLICATION (LEVEL 1) CONTROL COMMAND TO CONTROL FUNCTION OF EXTERNAL DEVICE | LIST OF FUNCTIONS ALLOWED TO INTEGRATED APPLICATION (LEVEL 2) | CONTROL COMMAND TO EXECUTE CONTROL APPLICATION |
| STORING POSITION OF CONTROL COMMAND | STORAGE SPACE CORRESPONDING TO INTEGRATED CONTROL APPLICATION | STORAGE SPACE CORRESPONDING TO CONTROL APPLICATION | STORAGE SPACE CORRESPONDING TO CONTROL APPLICATION |
| SUBJECT OF CONTROL COMMAND TRANSMISSION | INTEGRATED CONTROL APPLICATION | INTEGRATED CONTROL APPLICATION | CONTROL APPLICATION |

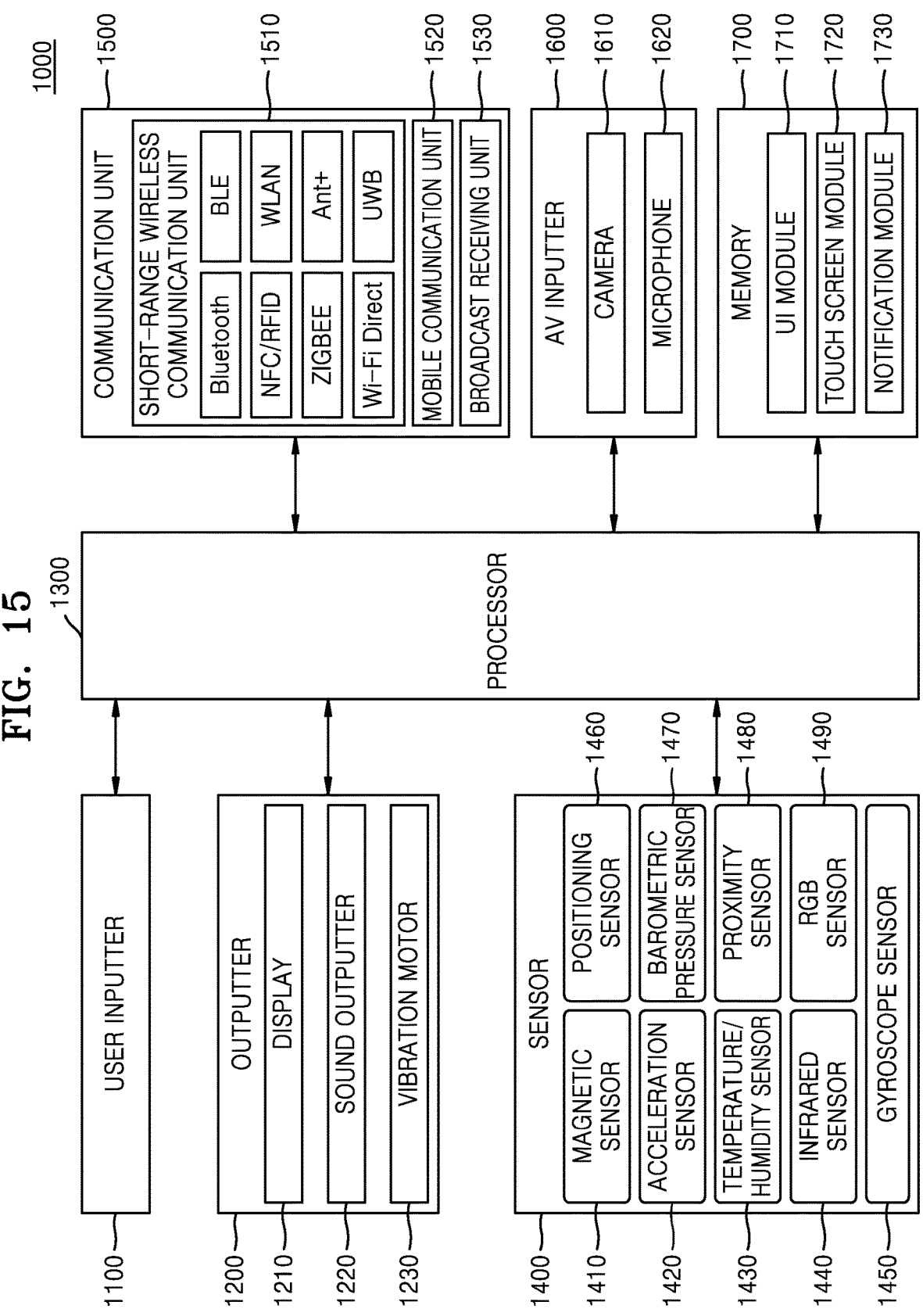

DEVICE AND METHOD FOR GENERATING GUI FOR CONTROLLING EXTERNAL DEVICE

TECHNICAL FIELD

The present disclosure relates to a device and method for generating a graphical user interface (GUI) for controlling an external device, and more particularly to a device and method for generating a GUI for controlling a plurality of external devices.

BACKGROUND ART

As network and multimedia technologies develop, a user may control another device by using a device. In general, a control application for controlling an external device is provided by a manufacturer or from the external device.

A control application for controlling an external device, according to the related art, is provided in the form of an exclusive application for each individual device. When an exclusive control application is provided for each external device, a user may have difficulty controlling a plurality of external devices.

Furthermore, although a control application for controlling external devices altogether is provided, such a control application provides a control function only for some predetermined external devices. Accordingly, it may be difficult to control various external devices by effectively integrating the external devices.

DESCRIPTION OF EMBODIMENTS

Technical Problem

According to some embodiments, provided are a device and method for generating a GUI for controlling an external device, which may edit an integrated GUI for controlling the external device and other external devices altogether after a control application of the external device is downloaded.

Furthermore, according to some embodiments, provided are a device and method for generating a GUI for controlling an external device, which may generate and edit an integrated GUI according to whether a downloaded control application interacts with an integrated control application.

Solution to Problem

According to an aspect of the present disclosure, a device for generating a graphic user interface (GUI) for controlling a plurality of external devices includes a communication interface configured to communicate with the plurality of external devices and download a plurality of control applications to control the plurality of external devices, a processor configured to collect, from the plurality of downloaded control applications, function information to control the plurality of external devices, and configured to provide an integrated application to control the plurality of external devices by using the collected function information, and a display displaying the GUI for controlling the plurality of external devices when the integrated application is executed, wherein the GUI controls some functions selected from among functions provided by the plurality of external devices.

Furthermore, according to another aspect of the present disclosure, a method of generating, by a device, a GUI for controlling a plurality of external devices, includes downloading a plurality of control applications to control the plurality of external devices, collecting, from the plurality of downloaded control applications, function information to control the plurality of external devices, providing an integrated application to control the plurality of external devices by using the collected function information, and displaying the GUI for controlling the plurality of external devices when the integrated application is executed, wherein the GUI controls some functions selected from among functions provided by the plurality of external devices.

Furthermore, according to another aspect of the present disclosure, a non-transitory computer-readable recording medium is provided having recorded thereon a program to execute the method according to the above aspect.

BRIEF DESCRIPTION OF DRAWINGS

FIG. 6 is an example of a table showing levels of functions of an external device, according to some embodiments.

FIGS. 14 and 15 are block diagrams of a device, according to some embodiments.

MODE OF DISCLOSURE

Figure 1:
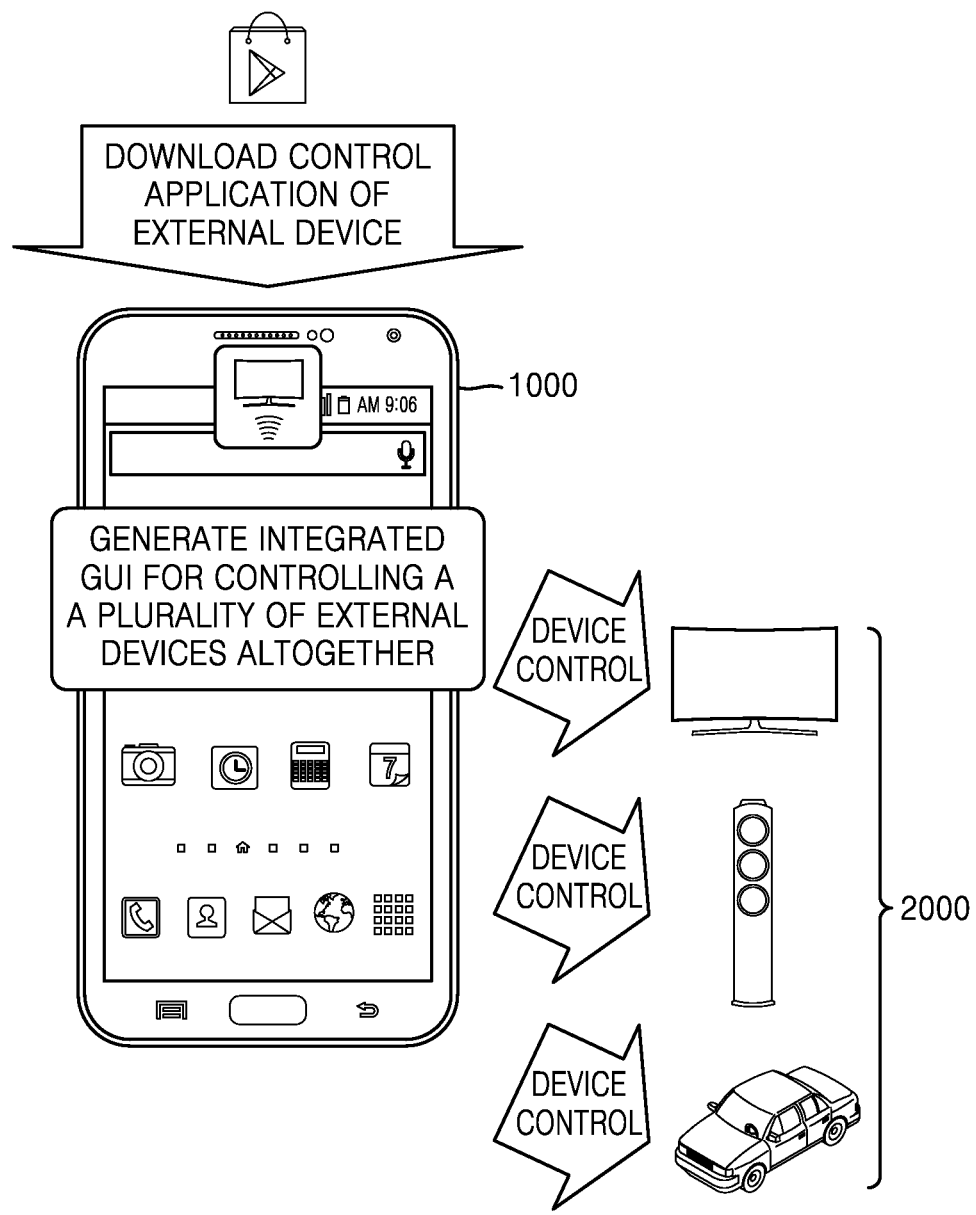
FIG. 1 illustrates an example in which a device controls at least one external device, according to some embodiments.

The present disclosure will now be described more fully with reference to the accompanying drawings, in which embodiments of the disclosure are shown. In the following description, when detailed descriptions about related well-known functions or structures are determined to make the gist of the present disclosure unclear, the detailed descriptions will be omitted herein. Throughout the drawings, like reference numerals denote like elements.

In the present specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements.

Furthermore, in the present specification, an integrated control application may signify an application for controlling a plurality of external devices altogether, and objects to control functions preset to each of external devices may be included in a graphic user interface (GUI) of the integrated control application.

Furthermore, a control application of an external device may be an exclusive control application for controlling an external device 2000, for example, an application provided by a manufacturer of the external device 2000. However, the present disclosure is not limited thereto, and the control application of the external device may be a control application generated by a subject other than the manufacturer.

Furthermore, an integrated GUI may be a GUI of the integrated control application, and may include objects to control some of functions of a plurality of external devices. In this case, the object included in the integrated GUI may correspond to a preset function of the external device.

The present disclosure is described in detail with reference to the accompanying drawings.

FIG. 1 illustrates an example in which a device 1000 controls at least one external device 2000, according to some embodiments.

Referring to FIG. 1, the device 1000 may download, from an application store, a control application for controlling at least one external device 2000 and, after downloading the control application, may generate an integrated GUI for controlling the at least one external device 2000. The control application for controlling the external device 2000 may be an exclusive control application for controlling the external device 2000, for example, an application provided by the manufacturer of the external device 2000.

Furthermore, when downloading the control application of the external device 2000, before, during, or after installation of the downloaded control application, the device 1000 may select a preset function of the external device 2000 and generate a GUI including an object to control the selected function.

When downloading the control application of the external device 2000, before, during, or after the installation of the downloaded control application, the device 1000 may select the preset function of the external device 2000 and add the object to control the selected function to the integrated GUI, thereby generating or updating the integrated GUI. Furthermore, the device 1000 may control the at least one external device 2000 by using the integrated GUI.

The device 1000 may be smartphones, table PCs, PCs, smart TVs, mobile phones, personal digital assistants (PDAs), laptop computers, media players, micro servers, global positioning system (GPS) devices, electronic book terminals, digital broadcasting terminals, navigation devices, kiosks, MP3 players, digital cameras, consumer electronics, and other mobile or non-mobile computing devices, but the present disclosure is not limited thereto. Furthermore, the device 1000 may be wearable devices, such as watches, glasses, hair bands, and rings, having a communication function and a data processing function. However, the present disclosure is not limited thereto, and the device 1000 may include all types of device capable of controlling the external device 2000 through a network.

The external device 2000 may be smartphones, table PCs, PCs, smart TVs, mobile phones, PDAs, laptop computers, media players, micro servers, GPS devices, electronic book terminals, digital broadcasting terminals, navigation devices, kiosks, MP3 players, digital cameras, consumer electronics, electronic devices in an automobile, and other mobile or non-mobile computing devices, but the present disclosure is not limited thereto. Furthermore, the device 1000 may be wearable devices, such as watches, glasses, hair bands, and rings, having a communication function and a data processing function. However, the present disclosure is not limited thereto, and the external device 2000 may include all types of devices capable of receiving a control command from the device 1000 through the network.

Furthermore, the device 1000 may be connected to and communicated with a server (not shown) that provides a control application and the external device 2000 though the network. In this case, the network may include a local area network (LAN), a wide area network (WAN), a value added network (VAN), a mobile radio communication network, a satellite communication network, and a combination thereto, may be a data communication network in a comprehensive meaning, by which the device 1000, the server, and the external device 2000 may smoothly communicate with one another, and may include a wired Internet, a wireless Internet, and a mobile wireless communication network. Furthermore, the wireless communication may include, for example, wireless LAN (Wi-Fi), Bluetooth, Bluetooth low energy, Zigbee, Wi-Fi Direct (WFD), ultra wideband (UWB), infrared data association (IrDA), and near field communication (NFC), but the present disclosure is not limited thereto.

Figure 2:
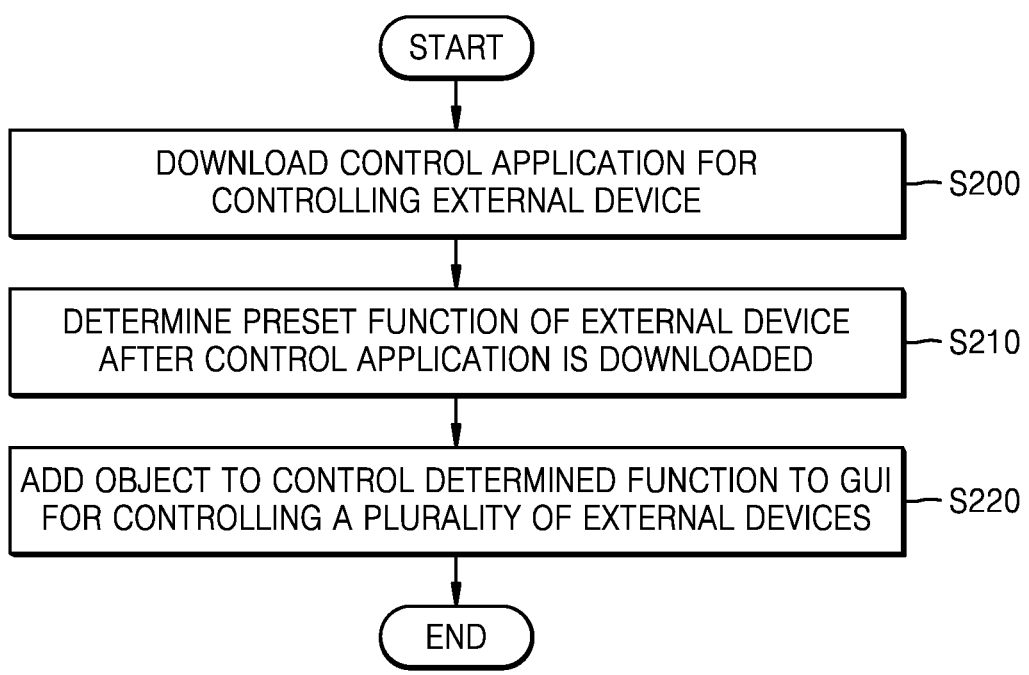
FIG. 2 is a flowchart of a method of generating, by a device, a graphical user interface (GUI) for controlling an external device, according to some embodiments.

FIG. 2 is a flowchart of a method of generating a GUI for controlling, by the device 1000, the external device 2000, according to some embodiments.

In S200, the device 1000 may download a control application for controlling the external device 2000. The control application for controlling the external device 2000 may be an exclusive application provided by the manufacturer of the external device 2000, but the present disclosure is not limited thereto. The control application for controlling the external device 2000 may be a control application generated by a subject other than the manufacturer.

The device 1000 may access to the application store and download a control application for controlling the external device 2000 from the application store. Alternatively, the device 1000 may receive the control application of the external device 2000 from a certain storage medium, another device (not shown), or an external server (not shown), but a method of receiving, by the device 1000, the control application of the external device 2000 is not limited thereto.

In S210, after downloading the control application, the device 1000 may determine the preset function of the external device 2000. As the control application of the external device 2000 is downloaded, the device 1000 may check whether the control application of the external device 2000 is downloaded and may identify a downloaded control application. The device 1000 may determine in real time whether the control application of the external device 2000 is downloaded, by monitoring whether the control application of the external device 2000 is downloaded.

Alternatively, the device 1000 may determine the preset function of the external device 2000 during or after the installation of the downloaded control application, but the present disclosure is not limited thereto. In this case, the device 1000 may monitor in real time whether the downloaded control application is installed.

Furthermore, the preset function of the external device 2000 may be some functions of the functions of the external device 2000. Furthermore, the device 1000 may select some functions from among the functions of the external device 2000, so that some functions of the functions of the external device 2000 corresponding to the downloaded control application may be controlled by the integrated application.

Furthermore, the preset function of the external device 2000 may be a preset function, that is, a function to be controlled by the integrated control application, and may be preset by the manufacturer of the external device 2000 when the control application is generated. In this case, information about the preset function of the external device 2000 may be provided from the control application to the integrated control application. Furthermore, the functions of the external device 2000 may be set to different levels according to a degree of being used by the integrated control application. The level of the function of the external device 2000 is described in detail with reference to FIG. 6.

Alternatively, the preset function of the external device 2000 may be set by the device 1000. The device 1000 may set the function of the external device 2000 to be controlled through the integrated control application. The device 1000 may extract, for example, a list of functions to be controlled by the external device 2000 from the control application and receive a user's input to select a particular function from the extracted list. Furthermore, the device 1000 may determine a particular function to be a function to be controlled by the integrated control application, based on the user's input.

Furthermore, the preset function of the external device 2000 may be a function predefined by the integrated control application. In this case, by the integrated control application, functions to be included in the integrated GUI of the integrated control application may be previously defined among the functions of the control application and a list of the control applications to interact with the integrated control application.

In S220, the device 1000 may add an object to control the determined function to an integrated GUI for controlling a plurality of external devices. The object may be at least one of a text, an icon, and an image displayed in the integrated GUI. The object may include, for example, an object to control the external device 2000 through the integrated control application and an object to execute a control application for exclusively controlling the external device 2000, but the present disclosure is not limited thereto.

The device 1000 may update the integrated GUI by adding an object to control the function of the external device 2000 to the integrated GUI. In this case, in S200, the integrated GUI for other external devices other than the external device 2000 may be previously generated. In S220, the device 1000 may update the previously generated integrated GUI.

Furthermore, when the object in the integrated GUI is selected by a user, the device 1000 may control the function of the external device 2000 corresponding to the selected object.

Figure 3:
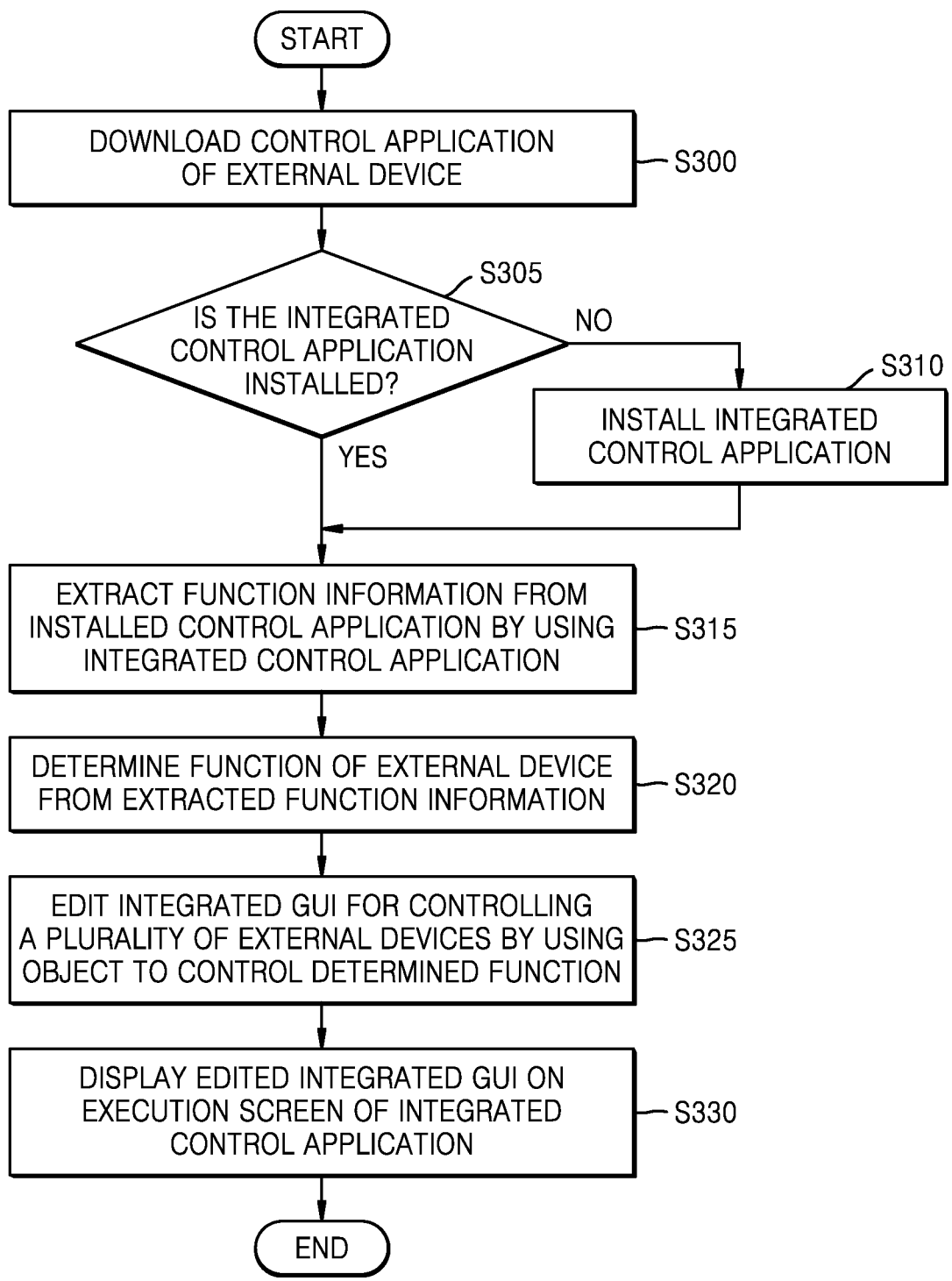
FIG. 3 is a flowchart of a method of editing and displaying, by a device, a GUI for controlling a plurality of external devices by using an integrated application, according to some embodiments.

FIG. 3 is a flowchart of a method of editing and displaying a GUI for controlling, by the device 1000, a plurality of external devices 2000, by using the integrated application, according to some embodiments.

In S300, the device 1000 may download the control application of the external device 2000.

In S305, the device 1000 may determine whether the integrated control application is installed. The device 1000 may monitor whether the control application of the external device 2000 is downloaded, and when the control application is downloaded, determine whether the integrated control application is downloaded.

As a result of the determination in S305, when the integrated control application is not installed, in S310, the device 1000 may install the integrated control application. The device 1000 may access the external server that provides the integrated control application, by using preset link information, download the integrated control application from the external server, and install the downloaded integrated control application. The device 1000 may download and install the integrated control application in the background, but the present disclosure is not limited thereto. The device 1000 may display a GUI for downloading the integrated control application and download and install the integrated control application according to the user's input.

In S315, the device 1000 may extract function information from the installed control application by using the integrated control application. The device 1000 may obtain the function information about the function of the external device 2000 to be controlled by the control application from the control application. The device 1000 may obtain, for example, information about a list of functions of the external device 2000 and a level of the function of the external device 2000. For example, when the list of the functions of the external device 2000 is previously defined by the control application, the list of the functions of the external device 2000 may be provided from the control application to the integrated control application.

The level of the function of the external device 2000 may be previously set in connection with whether the function of the external device 2000 is controllable by the integrated control application. The level of the function of the external device 2000 may be set, for example, whether a control command to control the function of the external device 2000 is provided to the integrated control application and whether the integrated control application is allowed to control the function of the external device 2000. The level of the function of the external device 2000 is described in detail with reference to FIG. 6.

Furthermore, as the control application installed in the device 1000 pushes the function information to the integrated control application, the integrated control application may obtain the function information. Alternatively, as the integrated control application requests the function information from the control application and receives the function information, the integrated control application may obtain the function information.

In S320, the device 1000 may determine the function of the external device 2000 from the extracted function information. The device 1000 may identify the function to be controlled by the integrated control application from among the functions of the external device 2000 by using the extracted function information. For example, the device 1000 may determine whether the function of the external device 2000 is controlled by the integrated control application, based on the level of the function of the external device 2000 included in the function information.

Furthermore, the device 1000 may determine a particular function among the functions to be controlled by the integrated control application. The device 1000 may display, on a screen of the device 1000, a list of the functions to be controlled by the integrated control application, and select at least some of the functions to be controlled by the integrated control application according to a user's selection input. Furthermore, the functions to be controlled by the integrated control application may be some essential functions among the functions for the operation of the external device 2000.

In S325, the device 1000 may edit the integrated GUI for controlling a plurality of external devices, by using the object to control the determined function. For example, the device 1000 may generate the object to control the function of the external device 2000 by matching the control command to control the function of the external device 2000 or path information to call the control command with the object. Furthermore, the integrated GUI may be edited by adding the generated object to the integrated GUI.

In this case, the integrated GUI may be previously generated and may include objects to control functions of other external devices. Furthermore, the device 1000 may add, for example, an identification value of the external device 2000, an object to control the determined function of the external device 2000, and an object to execute the exclusive control application of the external device 2000, to the integrated GUI, but the present disclosure is not limited thereto.

In S330, the device 1000 may display the edited integrated GUI on an execution screen of the integrated control application. For example, the edition of the integrated GUI may be performed in the background by the integrated control application. When the integrated control application is executed in the foreground, the edited integrated GUI may be displayed on the execution screen of the integrated control application, but the present disclosure is not limited thereto.

Figure 4:
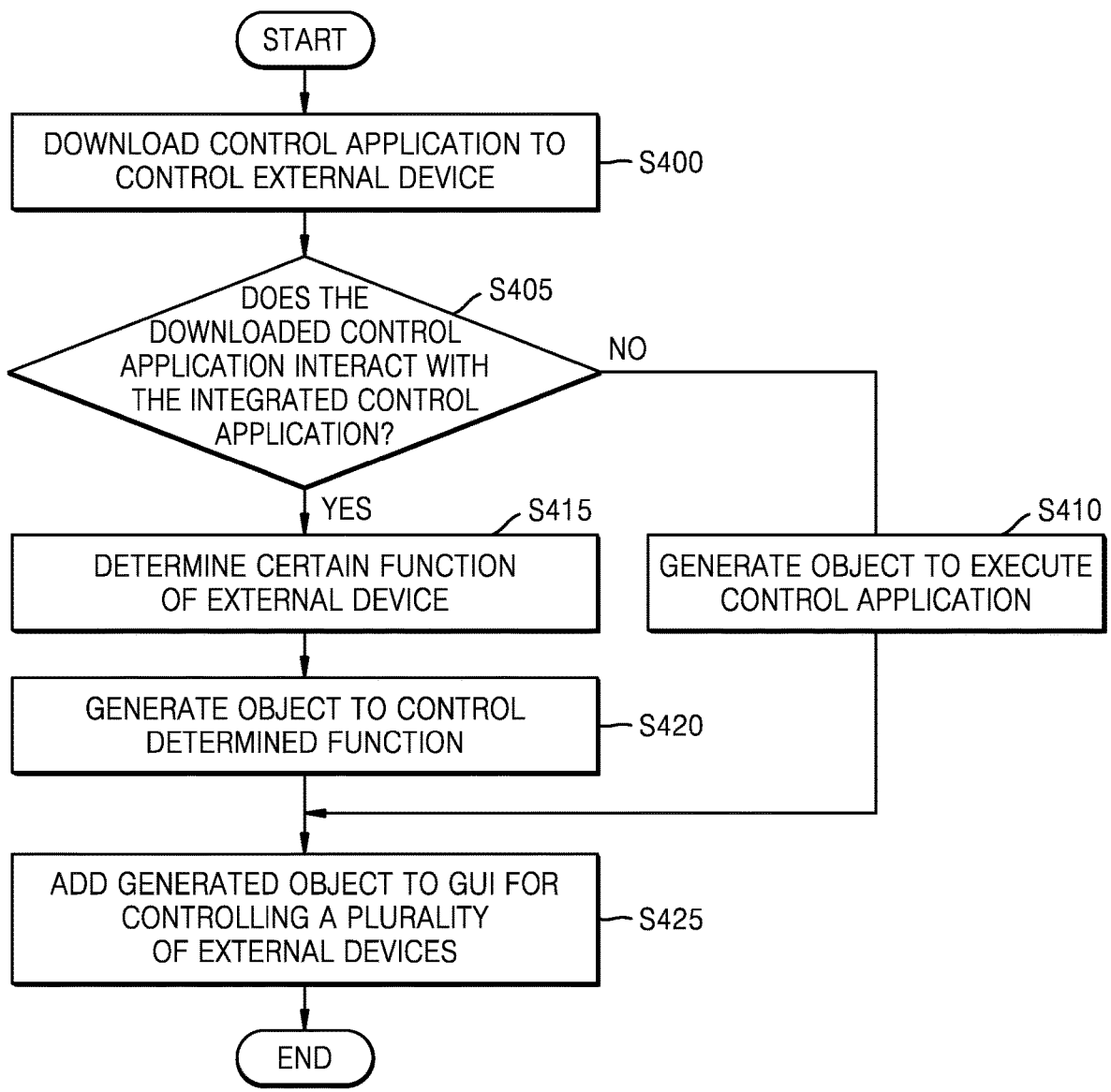
FIG. 4 is a flowchart of a method of generating, by a device, a GUI based on whether a control application interacts with an integrated control application, according to some embodiments.

FIG. 4 is a flowchart of a method of generating, by the device 1000, a GUI based on whether a control application interacts with an integrated control application, according to some embodiments.

In S400, the device 1000 may download the control application for controlling the external device 2000. The control application for controlling the external device 2000 may be an exclusive application provided by the manufacturer of the external device 2000.

In S405, the device 1000 may determine whether the downloaded control application interacts with the integrated control application. To control a certain function of the external device 2000, the integrated control application and the control application may interact with each other in various methods. Furthermore, for example, the integrated control application may determine whether the control application shares the certain function with the integrated control application. For example, the integrated control application may determine whether some functions of the control application are provided to the integrated control application. For example, the integrated control application may determine whether the control application provides a control command to control the certain function of the external device 2000 to the integrated control application. For example, the integrated control application may determine whether the control application provides the certain function of the external device 2000 at the request of the integrated application.

As a result of the determined in S405, when the downloaded control application is determined not to interact with the integrated control application, in S410, the device 1000 may generate an object to execute the control application. The device 1000 may generate an object to execute the control application, for example, by associating an icon of the control application with the control command to execute the control application.

As a result of the determination in S405, when the downloaded control application is determined to interact with the integrated control application, in S415, the device 1000 may determine the certain function of the external device 2000. The device 1000 may select some functions to be controlled by the integrated control application from among the functions of the external device 2000.

In S420, the device 1000 may generate an object to control the determined function. In S425, the device 1000 may add the generated object to the integrated GUI for controlling a plurality of external devices.

Figure 5:
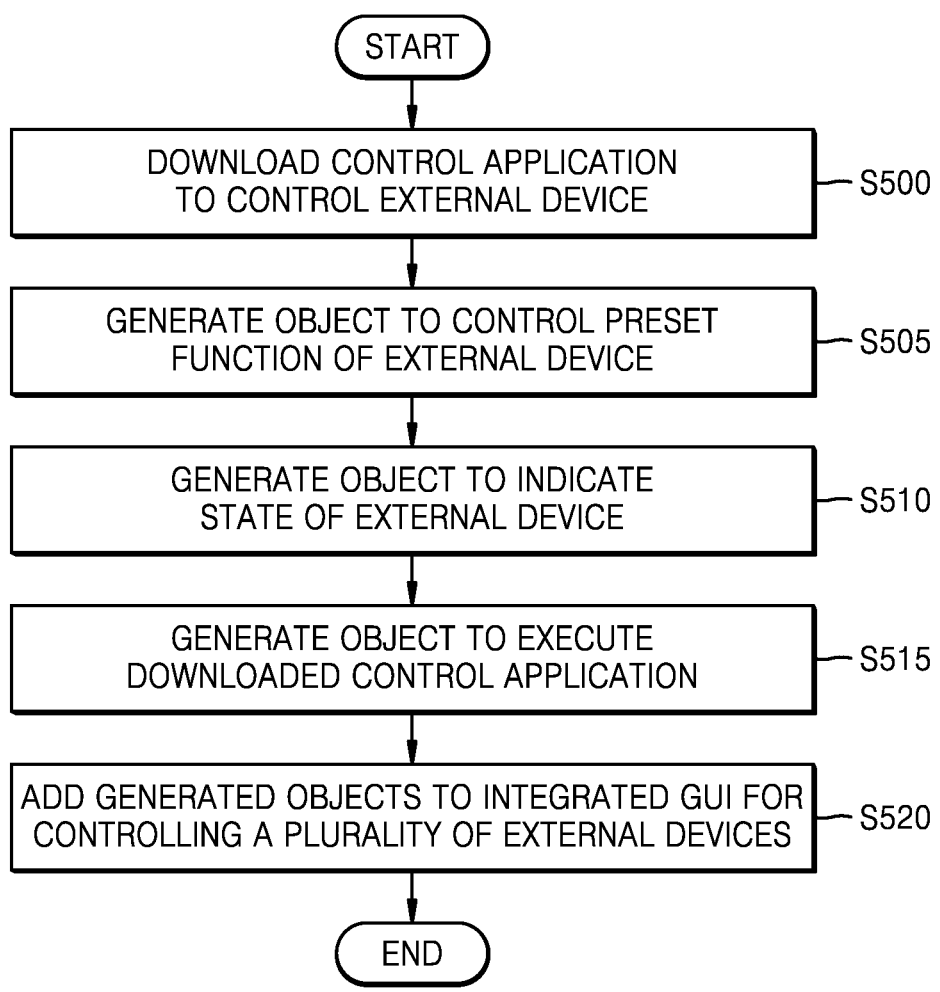
FIG. 5 is a flowchart of a method of adding, by a device, objects with various attributes to control external devices, according to some embodiments.

FIG. 5 is a flowchart of a method of adding, by the device 1000, objects with various attributes to control the external device 2000, according to some embodiments.

In S500, the device 1000 may download the control application to control the external device (2000).

In S505, the device 1000 may generate an object to control the preset function of the external device 2000. The device 1000 may generate the object to control the function of the external device 2000 by matching path information to call the control command to control the function of the external device 2000 from a memory, with a certain icon. In this case, the control command to control the function of the external device 2000 may be stored at a different position according to the level of the function of the external device 2000. For example, the control command to control the function of the external device 2000 may be stored in a storage space assigned with respect to the integrated control application in the memory of the external device 2000. Furthermore, for example, the control command to control the function of the external device 2000 may be stored in the storage space assigned with respect to the control application of the external device 2000 in the memory of the external device 2000.

Furthermore, the device 1000 may match a command to request the control application of the external device 2000 to control the function of the external device 2000, with a certain icon.

In S510, the device 1000 may generate an object to indicate the state of the external device 2000. In this case, the device 1000 may generate the object to indicate the state of the external device 2000 by matching a control command to request state information indicating the state of the external device 2000 from the external device 2000, with a certain icon. Furthermore, the device 1000 may match a command to request the control application of the external device 2000 to obtain and provide the state information of the external device 2000 from the control application of the external device 2000, with a certain icon. Alternatively, the device 1000 may generate a text indicating the state of the external device 2000 by obtaining the state information by monitoring the state of the external device 2000 or when a certain event occurs.

In S515, the device 1000 may generate an object to execute the control application of the external device 2000. The device 1000 may generate the object to execute the control application of the external device 2000 by matching an execution command to execute the control application of the external device 2000, with a certain icon. When the object to execute the control application is selected within the integrated GUI, a GUI of the control application for controlling the external device 2000 may be displayed on the screen of on the screen of the device 1000.

In S520, the device 1000 may add the generated objects to the integrated GUI for controlling a plurality of external devices. As the generated objects are added to the integrated GUI, the positions or arrangement of the objects to control the functions of other external devices in the integrated GUI may be changed.

FIG. 6 is an example of a table 60 showing levels of functions of the external device 2000, according to some embodiments.

Referring to FIG. 6, the function of the external device 2000 may be classified into, for example, Level 1, Level 2, and Level 3. In this case, the level of the function of the external device 2000 may be classified based on the right of the integrated control application to access the control command to control the function of the external device 2000.

When the function of the external device 2000 is a function of Level 1, the device 1000 may obtain the control command to control the function of the external device 2000 from the control application and store the obtained control command in a storage space assigned to the integrated control application in a memory of the device 1000. Furthermore, a list of functions of Level 1 may be provided to the integrated control application.

Furthermore, the device 1000 may independently control the external device 2000 regardless of the control application of the external device 2000 by using the control command stored in the storage space assigned to the integrated control application. The function of Level 1 may be generally an essential function that is frequently used by a user.

When the function of the external device 2000 is a function of Level 2, the control command to control the function of the external device 2000 may be stored in a storage space assigned to the control application of the external device 2000 in the memory of the device 1000. Furthermore, a list of functions of Level 2 may be provided to the integrated control application.

In this case, the device 1000 may obtain a right on which the integrated control application may transmit the control command to control the function of the external device 2000 to the external device 2000 by using the control application. Accordingly, the integrated control application may request the control application to provide the control command to control the function of the external device 2000 to the integrated control application.

When the function of the external device 2000 is a function of Level 3, the control command to control the function of the external device 2000 may not be provided to the integrated control application. In this case, the integrated control application may not directly transmit the control command to the external device 2000, and may request the control application to transmit the control command to control the function of the external device 2000 to the external device 2000. The control application may transmit the control command to control the function of the external device 2000 to the external device 2000, upon the request of the integrated control application. In this case, the integrated control application may provide a first control command to request the control of the external device 2000 to the control application, and the control application may transmit a second control command to control the external device 2000 to the external device 2000, based on the provided first control command.

Figure 7:
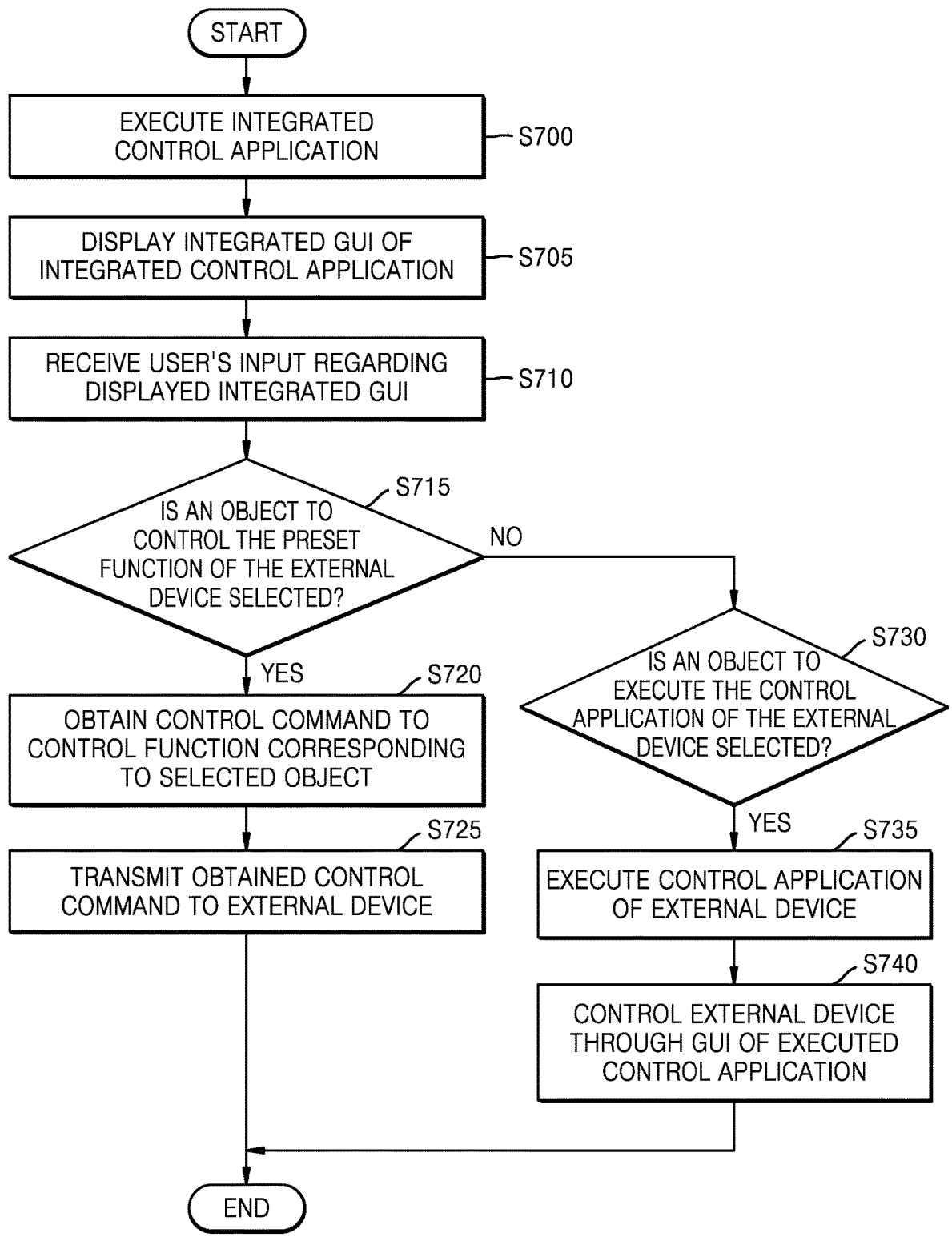
FIG. 7 is a flowchart of a method of controlling, by a device, an external device by using a GUI of the integrated control application, according to some embodiments.

FIG. 7 is a flowchart of a method of controlling, by the device 1000, an external device by using a GUI of the integrated control application, according to some embodiments.

In S700, the device 1000 may execute the integrated control application. In S705, the device 1000 may display the integrated GUI of the integrated control application. As an icon of the integrated control application displayed on the screen of the device 1000 is selected, the integrated control application may be executed. Furthermore, when the control application of the external device 2000 is downloaded or installed in the device 1000, the integrated control application may be executed in the background or foreground.

In S710, the device 1000 may receive the user's input regarding the displayed integrated GUI. Objects with various attributes may be displayed in integrated GUI, and the device 1000 may receive the user's input to select at least one object.

In S715, the device 1000 may determine whether the object to control the preset function of the external device 2000 is selected.

As a result of the determination of S715, when the object to control the preset function of the external device 2000 is determined to be selected, in S720, the device 1000 may obtain a control command to control a function corresponding to the selected object. For example, when the selected function is a function of Level 1, the device 1000 may extract, from the memory, the control command stored in the storage space assigned to the integrated control application in the memory. Furthermore, for example, when the selected function is a function of Level 2, the device 1000 may obtain a control command from the control application by requesting the control application to provide the control command to the integrated control application.

In S725, the device 1000 may transmit the obtained control command to the external device 2000. Accordingly, the preset function of the external device 2000 may be controlled by the integrated control application of the device 1000.

As a result of the determined in S715, when the object to control the preset function of the external device 2000 is determined not to be selected, in S730, the device 1000 may determine whether the object to execute the control application of the external device 2000 is selected.

When the object to execute the control application of the external device 2000 is determined to be selected, in S735, the device 1000 may execute the control application of the external device 2000. In this case, the control application may be executed in the middle of execution of the integrated control application.

In S740, the device 1000 may control the external device 2000 through the GUI of the executed control application. The device 1000 may display the GUI of the executed control application on the screen of the device 1000, and control the external device 2000 based on the user's input through the display.

Figure 8:
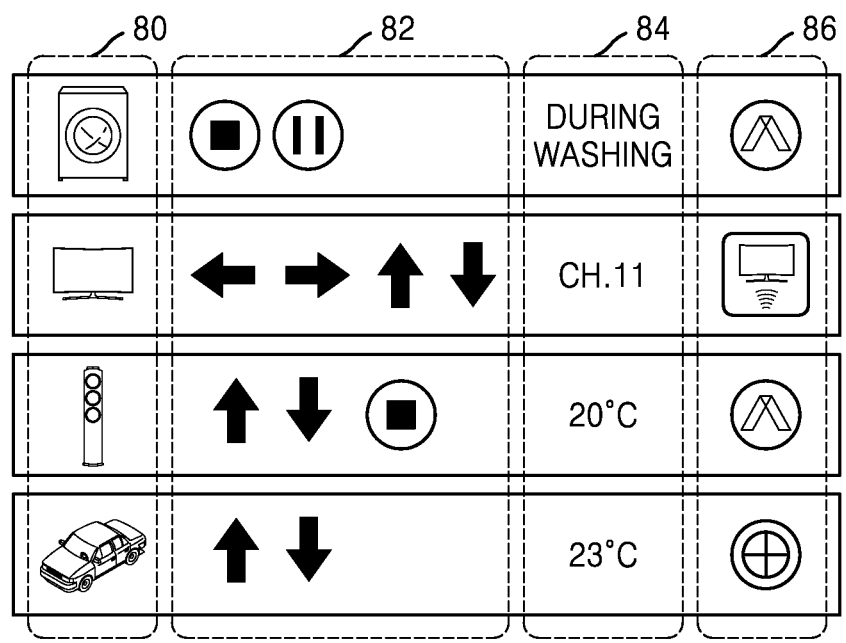
FIG. 8 illustrates examples of objects included in an integrated GUI of the integrated control application, according to some embodiments.

FIG. 8 illustrates examples of objects included in the integrated GUI of the integrated control application, according to some embodiments.

Referring to FIG. 8, the integrated GUI may include an area 80 displaying an object to identify the external device 2000, an area 82 displaying the object to control the function of the external device 2000, an area 84 displaying the object to indicate the state of the external device 2000, and an area 86 displaying the object to execute the control application of the external device 2000.

An icon indicating the external device 2000 may be displayed in the area 80 displaying the object to identify the external device 2000. For example, the area 80 displaying the object to identify the external device 2000 아], an icon of a washing machine, an icon of a TV, an icon of an air conditioner, and an icon of an automobile. Furthermore, the icon of the external device 2000 may be differently displayed according to the position of the external device 2000. For example, according to whether the external device 2000 is located inside or outside a house, the icon may be displayed to be highlighted or an object indicating the position of an external device may be displayed together around the icon.

An icon to control the function of the external device 2000 may be displayed in the area 82 displaying the object to control the function of the external device 2000. An object to control an essential function of the external device 2000 may be displayed in the area 82 displaying the object to control the function of the external device 2000. Furthermore, when a certain button (not shown) in the integrated GUI is selected, objects to control detailed functions of the external device 2000 may be displayed, but the present disclosure is not limited thereto.

Text indicating a current state of the external device 200 may be displayed in the area 84 displaying the object to indicate the state of the external device 2000. For example, a text indicating a current state of a washing machine, a text indicating a current channel of a TV, a text indicating a target temperature of an air conditioner, and a text indicating a current indoor temperature of an automobile may be displayed in the area 84 displaying the object to indicate the state of the external device 2000. Furthermore, when the text indicating the state of the external device 2000 is selected, a GUI showing a detailed current state of the external device 2000 may be displayed on the screen of the device 1000, but the present disclosure is not limited thereto.

An icon of the control application of the external device 2000 may be displayed in the area 86 indicating the object to execute the control application of the external device 2000. When the icon of the control application of the external device 2000 is selected, the device 1000 may execute the control application of the selected icon.

Figure 9A:
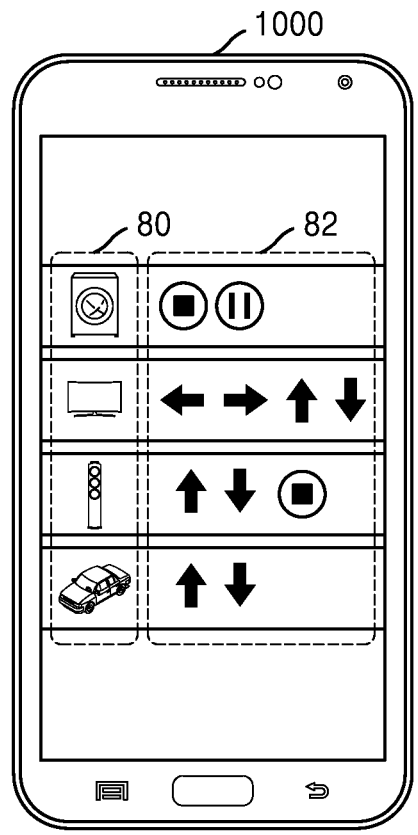
FIGS. 9A and 9B illustrate examples of integrated GUIs of the integrated control application displayed on a screen of the device, according to some embodiments.
Figure 9B:
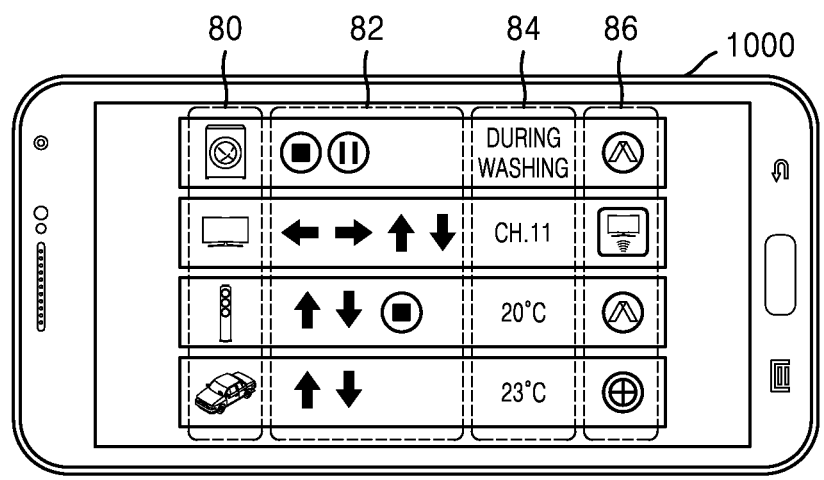

FIGS. 9A and 9B illustrate examples of integrated GUIs of the integrated control application displayed on the screen of the device 1000, according to some embodiments.

Referring to FIG. 9A, when the screen of the device 1000 is in a vertical mode, some of the areas of the integrated GUI may be displayed on the screen of the device 1000. For example, the area 80 displaying the object to identify the external device 2000 and the area 82 displaying the object to control the function of the external device 2000 may be displayed on the screen of the device 1000.

Furthermore, referring to FIG. 9B, when the screen of the device 1000 is in a horizontal mode, for example, the area 80 displaying the object to identify the external device 2000, the area 82 displaying the object to control the function of the external device 2000, the area 84 displaying the object to indicate the state of the external device 2000, and the area 86 indicating the object to execute the control application of the external device 2000 may be displayed on the screen of the device 1000.

Figure 10A:
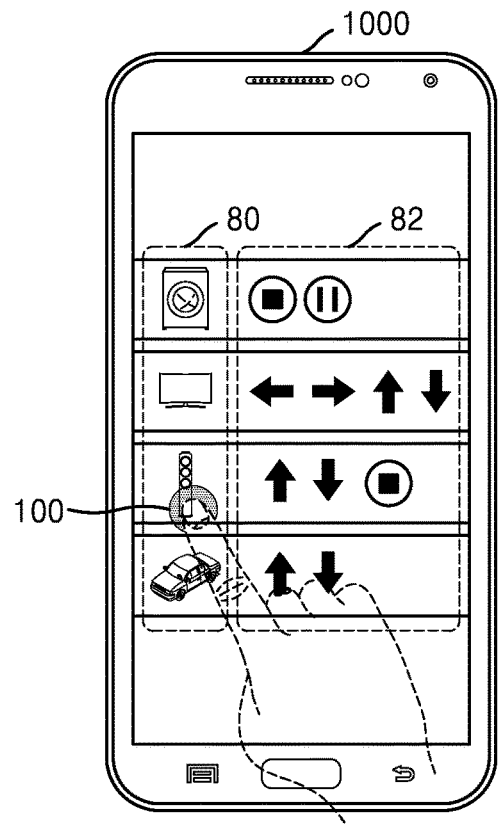
FIGS. 10A and 10B illustrate examples of displaying detailed menus for controlling an external device according to a user's input with respect to the integrated GUI, according to some embodiments.
Figure 10B:
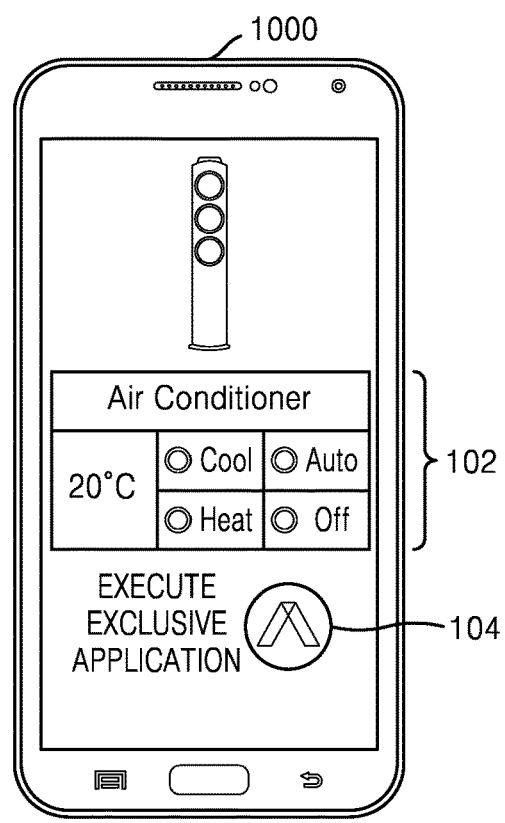

FIGS. 10A and 10B illustrate examples of displaying detailed menus for controlling the external device 2000 according to a user's input with respect to the integrated GUI, according to some embodiments.

Referring to FIG. 10A, a user may touch an icon 100 indicating the air conditioner among the icons displayed in the area 80 displaying the object to identify the external device 2000 in the integrated GUI.

Furthermore, when the icon 100 of an air conditioner is touched, as illustrated in FIG. 10B, a detailed menu 102 to control the function of an air conditioner may be displayed in the integrated GUI. The number of the functions to be controlled by the detailed menu 102 may be greater than that of the functions controlled by the icons of the area 82. Furthermore, when the icon 100 of an air conditioner is touched, an icon 104 to execute the control application of an air conditioner may be displayed in the integrated GUI with the detailed menu 102.

Figure 11A:
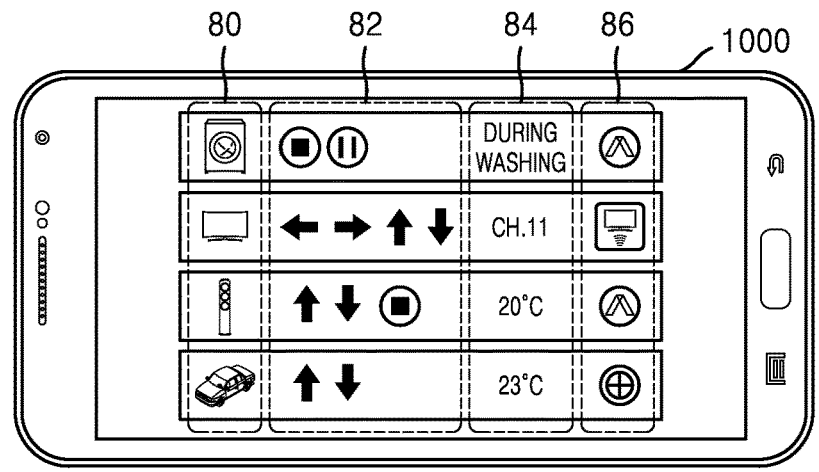
FIGS. 11A and 11B illustrate examples of executing a control application of an external device using the integrated GUI, according to some embodiments.
Figure 11B:
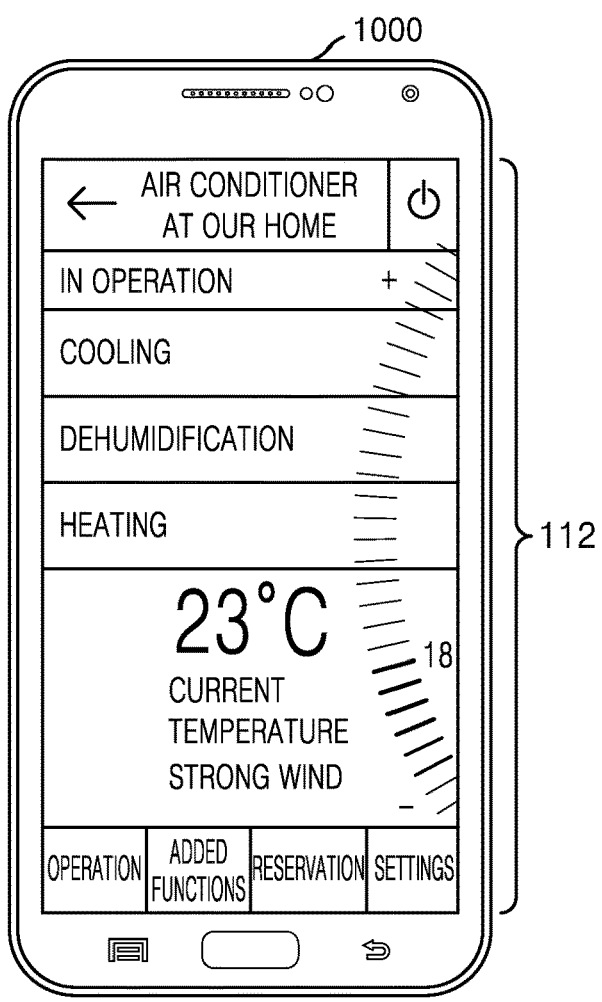

FIGS. 11A and 11B illustrate examples of executing the control application of the external device 2000 using the integrated GUI, according to some embodiments.

Referring to FIG. 11A, the user may touch an icon 110 to execute the control application of an air conditioner among the icons displayed in the area 86 indicating the object to execute the control application of the external device 2000 in the integrated GUI.

Furthermore, when the icon 110 to execute the control application of an air conditioner is touched, the device 1000 may execute the control application of an air conditioner and display an execution screen 112 of the executed control application on the screen of the device 1000.

Figure 12:
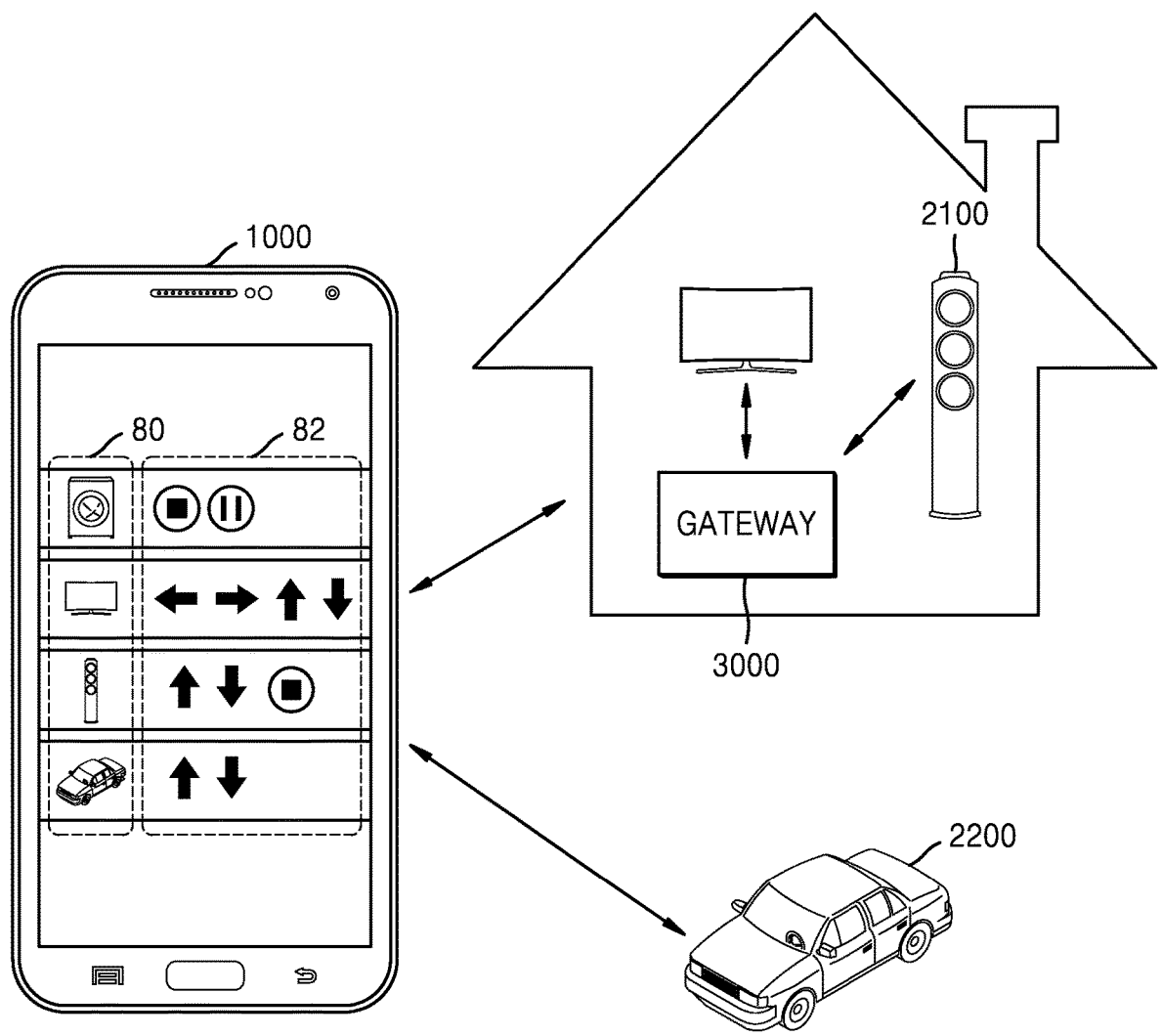
FIG. 12 illustrates an example of a control system of controlling, by a device, an external device, according to some embodiments.

FIG. 12 illustrates an example of a control system of controlling, by the device 1000, the external device 2000, according to some embodiments.

Referring to FIG. 12, a control system may include a first external device 2100 inside a house, a gateway 3000, and a second external device 2200 outside a house, in the device 1000.

The first external device 2100 inside a house may be controlled and managed through the gateway 3000, and the device 1000 may control the first external device 2100 inside a house through the gateway 3000 by using the integrated GUI. Furthermore, the device 1000 may control the second external device 2200 outside a house by transmitting the control command directly to the second external device 2200 outside a house.

Figure 13:
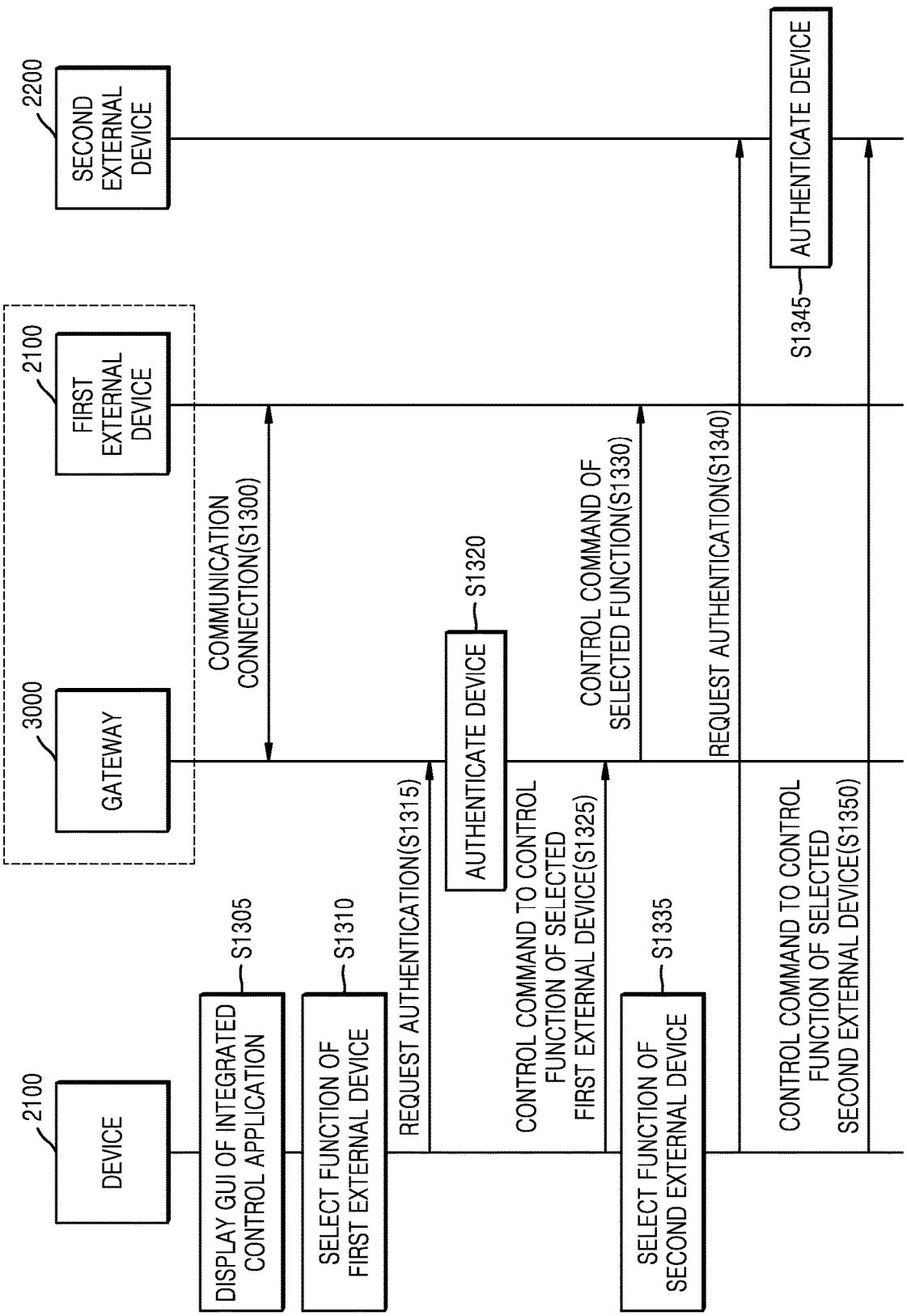
FIG. 13 is a flowchart of a method of controlling, by a device, an external device inside or outside a house, according to some embodiments.

FIG. 13 is a flowchart of a method of controlling, by the device 1000, an external device inside or outside a house, according to some embodiments.

In S1300, the gateway 3000 and the first external device 2100 may be communicably connected to each other. As the gateway 3000 is communicably connected to the first external device 2100, the first external device 2100 may be in a controllable and manageable state.

In S1305, the device 1000 may display the integrated GUI of the integrated control application. In the integrated GUI, an object to control the function of the first external device 2100 and an object to control the function of the second external device 2200 may be displayed together.

In S1310, the device 1000 may select the function of the first external device 2100. In the integrated GUI, based on a user's input to select the object to control the function of the first external device 2100, the device 1000 may select the function of the first external device 2100 as a function to be controlled.

In S1315, the device 1000 may request authentication from the gateway 3000. The device 1000 may transmit an identification value of the device 1000, an identification value of the user of the device 1000, and a value such as a password for authentication to the gateway 3000 for authentication. Furthermore, while transmitting an identification value of the first external device 2100 that is an object to be controlled and an identification value of a function to be controlled, to the gateway 3000, the device 1000 may request authentication from the gateway 3000.

In S1320, the gateway 3000 may authenticate the device 1000. The gateway 3000 may authenticate the device 1000 by using the identification value of the device 1000, the identification value of the user of the device 1000, and the password. Furthermore, the gateway 3000 may determine whether the device 1000 is authorized to control the function of the first external device 2100, by using the identification value of the first external device 2100 and the identification value of a function to be controlled.

In S1325, the device 1000 may transmit a control command to control the function of the first external device 2100 to the gateway 3000. In S1330, the gateway 3000 may transmit the control command to the first external device 2100. However, the present disclosure is not limited thereto, and the device 1000 may transmit the identification value of the function of the first external device 2100 to the gateway 3000, and the gateway 3000 may extract a control command to control the function of the first external device 2100 from a memory of the gateway 3000, by using the identification value of the function of the first external device 2100, and transmit the extracted control command to the first external device 2100.

In S1335, the device 1000 may select the function of the second external device 2200. The device 1000 may select the function of the second external device 2200 as a function to be controlled, based on a user's input to select the object to control the function of the second external device 2200 in the integrated GUI.

In S1340, the device 1000 may request authentication from the second external device 2200. The device 1000 may transmit the identification value of the device 1000, the identification value of the user of the device 1000, and the value such as a password for authentication to the second external device 2200 for authentication. Furthermore, while transmitting the identification value of a function to be controlled to the gateway 3000, the device 1000 may request authentication from the second external device 2200.

In S1345, the second external device 2200 may authenticate the device 1000. The second external device 2200 may authenticate the device 1000 by using the identification value of the device 1000, the identification value of the user of the device 1000, and the password. Furthermore, the second external device 2200 may determine whether the device 1000 is authorized to control the function of the second external device 2200, by using the identification value of a function to be controlled.

In S1350, the device 1000 may transmit a control command to control the function of the second external device 2200 to the second external device 2200.

Figure 14:
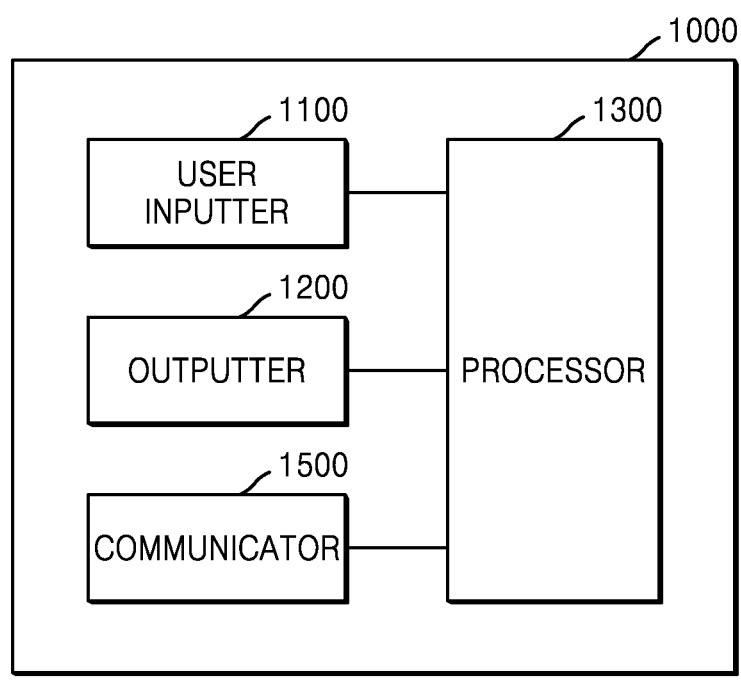

FIGS. 14 and 15 are block diagrams of the device 1000, according to some embodiments.

As illustrated in FIG. 14, according to some embodiments, the device 1000 may include a user inputter 1100, an outputter 1200, a processor 1300, and a communication unit 1500. However, it is not that all constituent elements illustrated in FIG. 14 are essential constituent elements of the device 1000. The device 1000 may be implemented by constituent elements greater than the number of the constituent elements illustrated in FIG. 14, and the device 1000 may be implemented by constituent elements less than the number the constituent elements illustrated in FIG. 14.

For example, as illustrated in FIG. 15, according to some embodiments, the device 1000 may further include a sensor 1400, an A/V inputter 1600, and a memory 1700, in addition to the user inputter 1100, the outputter 1200, the processor 1300, and the communication unit 1500.

The user inputter 1100 may signify a device for inputting data to control the device 1000 by the user. For example, the user inputter 1100 may include a key pad, a dome switch, a touch pad (a contact type capacitance method, a pressure type resistive film method, an infrared ray detection method, a surface ultrasonic wave conduction method, an integral type tension measurement method, or a piezo effect method), a jog wheel, and a jog switch, but the present disclosure is not limited thereto.

The user inputter 1100 may generate or edit the integrated GUI and receive a user's input to control the external device 2000 by using integrated GUI.

The outputter 1200 may output an audio signal, a video signal, or a vibration signal, and may include a display 1210, a sound outputter 1220, and a vibration motor 1230.

The display 1210 displays and outputs information processed in the device 1000. For example, the display 1210 may generate or edit the integrated GUI and display a user interface for controlling the external device 2000.

When the display 1210 and a touch pad have a layer structure forming a touch screen, the display 1210 may be used as an input device in addition to an output device. The display 1210 may include at least one of a liquid crystal display, a thin film transistor-liquid crystal display, an organic light-emitting diode, a flexible display, a 3D display, and an electrophoretic display.

The sound outputter 1220 may output audio data received from the communication unit 1500 or stored in the memory 1700. The vibration motor 1230 may output a vibration signal.

The processor 1300 typically controls an overall operation of the device 1000. For example, the processor 1300 may generally control the user inputter 1100, the outputter 1200, the sensor 1400, the communication unit 1500, and the AN inputter 1600, by executing programs stored in the memory 1700. The processor 1300 may use the integrated control application to perform the function of the device 1000 illustrated in FIGS. 1 to 13, and generate and edit the integrated GUI by using the integrated control application and control the external device 2000 based on the user's input through the integrated GUI.

In detail, the processor 1300 may download the control application for controlling the external device 2000. The processor 1300 may access the application store and download the control application for controlling the external device 2000 from the application store, by controlling the communication unit 1500. Alternatively, the processor 1300 may receive the control application of the external device 2000 from a certain storage medium, another device (not shown), or the external server.

The processor 1300 may determine the preset function of the external device 2000 after the control application is downloaded. As the control application of the external device 2000 is downloaded, the processor 1300 may check whether the control application of the external device 2000 is downloaded and identify the downloaded control application. The processor 1300 may determine in real time whether the control application of the external device 2000 is downloaded, by monitoring whether the control application of the external device 2000 is downloaded.

Alternatively, the processor 1300 may determine the preset function of the external device 2000 during or after the installation of the downloaded control application, but the present disclosure is not limited thereto. In this case, the processor 1300 may monitor in real time whether the downloaded control application is installed.

Furthermore, the preset function of the external device 2000 may be a preset function to be controlled by the integrated control application, and may be preset by the manufacturer of the external device 2000 when the control application is generated.

Alternatively, the preset function of the external device 2000 may be set by the processor 1300. The processor 1300 may set the function of the external device 2000 that is to be controlled through the integrated control application. The processor 1300 may extract, for example, a list of controllable functions of the external device 2000 from the control application, and receive a user's input to select a particular function from the extracted list. Furthermore, the processor 1300 may determine a particular function to be a function to be controlled through the integrated control application based on the user's input.

The processor 1300 may add an object to control the determined function to the integrated GUI for controlling a plurality of the external device 2000. The processor 1300 may update the integrated GUI by adding the object to control the function of the external device 2000 to the integrated GUI. In this case, an integrated GUI may be previously generated for other external devices other than the external device 2000 in operation 200, and the processor 1300 may update the previously generated integrated GUI.

Furthermore, when an object in the integrated GUI is selected by the user, the processor 1300 may control the function of the external device 2000 corresponding to the selected object.

The processor 1300 may determine that the function of the external device 2000 to be controlled, by using the function information obtained from the control application.

The processor 1300 may determine whether the integrated control application is installed. The processor 1300 may monitor whether the control application of the external device 2000 is downloaded, and when the control application is downloaded, determine whether the integrated control application is downloaded.

When the integrated control application is not installed, the processor 1300 may install the integrated control application. The processor 1300 may access the external server for providing the integrated control application by using the preset link information, download the integrated control application from the external server, and install the downloaded integrated control application. The processor 1300 may download and install the integrated control application in the background, but the present disclosure is not limited thereto. The processor 1300 may display a GUI for downloading the integrated control application, and download and install the integrated control application according to the user's input.

The processor 1300 may extract function information from the installed control application, by using the integrated control application. The processor 1300 may obtain the function information about the function of the external device 2000 to be controlled by the control application, from the control application. The processor 1300 may obtain, for example, information about the list of the functions of the external device 2000 and the level of the function of the external device 2000.

The processor 1300 may determine the function of the external device 2000 from the extracted function information. The processor 1300 may identify a function to be controlled by the integrated control application among the functions of the external device 2000, by using the extracted function information. For example, the processor 1300 may determine whether the function of the external device 2000 is controlled by the integrated control application, based on the level of the function of the external device 2000 included in the function information.

Furthermore, the processor 1300 may determine a particular function among the functions to be controlled by the integrated control application. The processor 1300 may display, on the screen of the device 1000, the list of the functions to be controlled by the integrated control application, and select at least some of the functions to be controlled by the integrated control application according to the user selection input.

The processor 1300 may determine whether the downloaded control application interacts with the integrated control application. When the downloaded control application is determined not to interact with the integrated control application, the processor 1300 may generate the object to execute the control application. When the downloaded control application is determined to interact with the integrated control application, the processor 1300 may determine a certain function of the external device 2000. The device 1000 may select some functions to be controlled by the integrated control application among the functions of the external device 2000, and generate the object to control the selected function.

The processor 1300 may generate the object to control the preset function of the external device 2000. The processor 1300 may generate the object to control the function of the external device 2000 by matching path information to call the control command to control the function of the external device 2000 from the memory, with a certain icon. In this case, the control command to control the function of the external device 2000 may be stored at a different position according to the level of the function of the external device 2000. For example, the control command to control the function of the external device 2000 may be stored in the storage space assigned to the integrated control application in the memory of the external device 2000. Furthermore, for example, the control command to control the function of the external device 2000 may be stored in the storage space assigned to the control application of the external device 2000 in the memory of the external device 2000.

Furthermore, the processor 1300 may match a command to request the control application of the external device 2000 to control the function of the external device 2000 from the control application of the external device 2000, with a certain icon.

The processor 1300 may generate the object to indicate the state of the external device 2000. In this case, the processor 1300 may generate the object to indicate the state of the external device 2000 by matching a control command to request the state information indicating the state of the external device 2000 from the external device 2000, with a certain icon. Furthermore, the processor 1300 may match a command to request the control application of the external device 2000 to obtain and provide the state information of the external device 2000 from the control application of the external device 2000, with a certain icon.

The processor 1300 may generate the object to execute the control application of the external device 2000. The device 1000 may generate the object to execute the control application of the external device 2000 by matching the execution command to execute the control application of the external device 2000, with a certain icon. Alternatively, the processor 1300 may generate the text indicating the state of the external device 2000 by monitoring the state of the external device 2000 or obtaining when a certain event occurs.

The processor 1300 may perform an operation of controlling the external device 2000 based on the type and attribute of the object selected by the user in the integrated GUI. Furthermore, the processor 1300 may directly control the external device 2000 or control the external device 2000 through the gateway 3000. In this case, the processor 1300 may request authentication from the external device 2000, or request authentication from the gateway 3000.

The sensor 1400 may sense the state of the device 1000 or the surrounding state of the device 1000, and transmit the sensed information to the processor 1300.

The sensor 1400 may include at least one of a magnetic sensor 1410, an acceleration sensor 1420, a temperature/humidity sensor 1430, an infrared sensor 1440, a gyroscope sensor 1450, a position sensor, for example, GPS, 1460, a barometric pressure sensor 1470, a proximity sensor 1480, and an RGB sensor (illuminance sensor) 1490, but the present disclosure is not limited thereto. Since the function of each sensor is intuitively deduced from the name thereof by one of ordinary skill in the art, detailed descriptions thereof are omitted.

The communication unit 1500 may include one or more constituent elements to enable the device 1000 to communicate with the outside, to generate or edit the integrated GUI and control the external device 2000 by using the integrated GUI. For example, the communication unit 1500 may include a short-range wireless communication unit 1510, a mobile communication unit 1520, and a broadcast receiving unit 1530.

Furthermore, the communication unit 1500 may be a communication interface for performing communication with the outside, and may include, for example, a first communication interface for communication with the external device 2000, and a second communication interface for communication with the server to download the control application. However, the implementation of the communication unit 1500 is not limited thereto.

The short-range wireless communication unit 1510 may include a Bluetooth communication unit, a Bluetooth low energy (BLE) communication unit, a near field communication unit, a WLAN (Wi-Fi) communication unit, a Zigbee communication unit, an infrared data association (IrDA) communication unit, a WFD (Wi-Fi direct) communication unit, an ultra wideband (UWB) communication unit, and an Ant+ communication unit, but the present disclosure is not limited thereto.

The mobile communication unit 1520 may transmit and receive a wireless signal with at least one of a base station, an external terminal, and a server in a mobile communication network. The wireless signal may include a voice call signal, a video call signal, or various forms of data according to transmission and receiving of a text/multimedia message.

The broadcast receiving unit 1530 receives a broadcast signal and/or information related to broadcast from the outside through a broadcast channel. The broadcast channel may include a satellite channel or a terrestrial channel According to implementation examples, the device 1000 may not include the broadcast receiving unit 1530.

Furthermore, the communication unit 1500 may generate or edit the integrated GUI and transmit and receive information needed to control the external device 2000 with respect to the external server, the application store, the external device 2000, and the gateway 3000, by using integrated GUI.

The audio/video (A/V) inputter 1600 for receiving an input of an audio signal or a video signal and may include a camera 1610 and a microphone 1620.

The memory 1700 may store a program for processing and controlling the processor 1300, and store data that is input to the device 1000 or output from the device 1000.

The memory 1700 may include at least one of storage media such as a flash memory type, hard disk type, multimedia card micro type, or card type memory, for example, SD or XD memory, random access memory (RAM), static random access memory (SRAM), read-only memory (ROM), electrically erasable programmable read-only memory (EEPROM), programmable read-only memory (PROM), a magnetic memory, a magnetic disk, and an optical disk.

The programs stored in the memory 1700 may be classified into a plurality of modules, for example, a UI module 1710, a touch screen module 1720, and a notification module 1730, according to a function thereof.

The UI module 1710 may provide specialized UI or GUI interacting with the device 1000 for each application. The touch screen module 1720 may sense a touch gesture of a user on a touch screen, and transmit information about the touch gesture to the processor 1300. According to some embodiments, the touch screen module 1720 may identify and analyze a touch code. The touch screen module 1720 may be configured with separate hardware including a controller.

An embodiment of the present disclosure may be embodied in the form of a recording medium including computer executable instructions, such as a program module executed by a computer. A computer-readable medium may be a useable medium that is accessible by a computer and may include all of volatile and non-volatile media and separable and inseparable media. Furthermore, the computer-readable medium may include all of computer storage media and communication media. The computer storage media may include all of volatile and non-volatile media and separable and inseparable media, which are embodied by a certain method or technology for storing information such as computer-readable instructions, data structures, program modules, or other data. The communication media may typically include computer-readable instructions, data structures, program modules, or other data of a modulated data signal such as a carrier wave, or other transmission mechanism, and may also include information transmission media.

Furthermore, in the present specification, the "unit" may be a hardware component such as a processor or a circuit, and/or a software component executed by the hardware component such as a processor.

The above descriptions of the present disclosure is for an example, and it will be understood that one of ordinary skill in the art to which the present disclosure pertains can easily modify the present disclosure into other detailed form without changing the technical concept or essential features of the present disclosure. Thus, the above-described embodiments are exemplary in all aspects and should not be for purposes of limitation. For example, each constituent element described to be a single type may be embodied in a distributive manner. Likewise, the constituent elements described to be distributed may be embodied in a combined form.

The scope of the present disclosure is defined not by the detailed description of the disclosure but by the appended claims, and all changes and modifications introduced from the concept and scope of the claims and the equivalent concept thereof will be construed as being included in the present disclosure.

The invention claimed is:

1. A device for generating a graphic user interface (GUI) for controlling a plurality of external devices, the device comprising:
   a display;
   a memory;
   a communication interface configured to:
      communicate with the plurality of external devices, and
      receive a plurality of exclusive control applications to control the plurality of external devices, from a server, wherein the plurality of exclusive control applications are exclusive applications for respective of the external devices; and
   a processor configured to:
      execute an integrated control application which is different from each of the plurality of exclusive control applications,
      install the plurality of exclusive control applications based on the received plurality of exclusive control applications,
      identify and extract function information for controlling the plurality of external devices among function information provided by the installed plurality of exclusive control applications, wherein the identified and extracted function information represents previously defined functions to be included in an integrated GUI of the integrated control application,
      add, to the integrated control application, a list of functions to control the plurality of external devices corresponding to the plurality of installed exclusive control applications,
      display the integrated GUI for controlling the plurality of external devices, generated based on the identified function information, through the integrated control application,
      receive a first user input to select a first icon in the integrated GUI, wherein the first icon is for directly controlling a function selected from among functions provided by the plurality of external devices,
      in response to receiving the first user input, execute a control command for directly controlling the function, wherein the control command is stored in a storage space assigned to the integrated control application in the memory of the device,
      receive a second user input to select a second icon in the integrated GUI, wherein the second icon is for controlling an external device from the plurality of external devices through an exclusive control application of the external device by executing the exclusive control application of the external device installed in the device, and
      in response to receiving the second user input, execute the exclusive control application of the external device.

2. The device of claim 1, wherein the communication interface is further configured to receive a new exclusive control application, and
   the processor is further configured to:
      install the new exclusive control application based on the received new exclusive control application.

3. The device of claim 2, wherein, when the new exclusive control application is received, the processor is further configured to determine whether the new exclusive control application interacts with the integrated control application.

4. The device of claim 1, wherein the list of functions of the plurality of external devices to be controlled by the integrated control application is preset in the integrated control application for each of the plurality of external devices.

5. The device of claim 1, wherein the list of functions of the plurality of external devices to be controlled by the integrated control application is provided from the plurality of exclusive control applications to the integrated control application.

6. The device of claim 1, wherein the processor is further configured to control the plurality of external devices based on a user's input to the GUI provided by the integrated control application.

7. The device of claim 6,
   wherein the control command to control the plurality of external devices is provided from the plurality of exclusive control applications to the integrated control application, and
   wherein the control command is provided by the integrated control application to the plurality of external devices.

8. The device of claim 6,
   wherein a control request to control the plurality of external devices is provided from the integrated control application to the plurality of exclusive control applications, and
   wherein the control command to control the plurality of external devices is provided, based on the control request, by the plurality of exclusive control applications to the plurality of external devices.

9. The device of claim 1, wherein the communication interface comprises:
   a first communication interface configured to communicate with the plurality of external devices; and
   a second communication interface configured to receive the plurality of exclusive control applications.

10. The device of claim 1, wherein the integrated control application is configured to obtain the function information based on the plurality of exclusive control applications configured to push the function information to the integrated control application.

11. The device of claim 1, further comprising:
    setting the list of functions to different levels according to a degree of use by the integrated control application, and
    wherein the different levels of the list of functions are classified based on a right of the integrated control application to access the control command to control the function selected from among the functions provided by the plurality of external devices.

12. A method of generating, by a device, a graphic user interface (GUI) for controlling a plurality of external devices, the method comprising:
    receiving a plurality of exclusive control applications to control the plurality of external devices, from a server, wherein the plurality of exclusive control applications are applications for respective of the external devices;
    executing an integrated control application which is different from each of the plurality of exclusive control applications;
    installing the plurality of exclusive control applications based on the received plurality of exclusive control applications;
    identifying and extracting function information for controlling the plurality of external devices among function information provided by the installed plurality of exclusive control applications, wherein the identified and extracted function information represents previously defined functions to be included in an integrated GUI of the integrated control application;

adding, to the integrated control application, a list of functions to control the plurality of external devices corresponding to the plurality of installed exclusive control applications;

displaying the integrated GUI for controlling the plurality of external devices, generated based on the identified function information, through the integrated control application;

receiving a first user input to select a first icon in the integrated GUI, wherein the first icon is for directly controlling a function selected from among functions provided by the plurality of external devices;

in response to receiving the first user input, executing a control command for directly controlling the function, wherein the control command is stored in a storage space assigned to the integrated control application in a memory of the device;

receiving a second user input to select a second icon in the integrated GUI, wherein the second icon is for controlling an external device from the plurality of external devices through an exclusive control application of the external device by executing the exclusive control application of the external device installed in the device; and in response to receiving the second user input, executing the exclusive control application of the external device.

13. The method of claim 12, further comprising:
receiving a new exclusive control application; and
installing the new exclusive control application based on the received new exclusive control application.

14. The method of claim 13, further comprising, as the new exclusive control application is received, determining whether the new exclusive control application interacts with the integrated control application.

15. A non-transitory computer-readable recording medium having recorded thereon at least one program comprising instructions to execute a method of generating, by a device, a graphic user interface (GUI) for controlling a plurality of external devices, the method comprising:

receiving a plurality of exclusive control applications to control the plurality of external devices, from a server, wherein the plurality of exclusive control applications are applications for respective of the external devices;

executing an integrated control application which is different from each of the plurality of exclusive control applications;

installing the plurality of exclusive control applications based on the received the plurality of exclusive control applications;

identifying and extracting function information for controlling the plurality of external devices among function information provided by the installed plurality of exclusive control applications, wherein the identified and extracted function information represents previously defined functions to be included in an integrated GUI of the integrated control application;

adding, to the integrated control application, a list of functions to control the plurality of external devices corresponding to the plurality of installed exclusive control applications;

displaying the integrated GUI for controlling the plurality of external devices, generated based on the identified function information, through the integrated control application;

receiving a first user input to select a first icon in the integrated GUI, wherein the first icon is for directly controlling a function selected from among functions provided by the plurality of external devices;

in response to receiving the first user input, executing a control command for directly controlling the function, wherein the control command is stored in a storage space assigned to the integrated control application in a memory of the device;

receiving a second user input to select a second icon in the integrated GUI, wherein the second icon is for controlling an external device from the plurality of external devices through an exclusive control application of the external device by executing the exclusive control application of the external device installed in the device; and in response to receiving the second user input, executing the exclusive control application of the external device.

* * * * *